US011465740B2

(12) United States Patent
Perez Barrera et al.

(10) Patent No.: US 11,465,740 B2
(45) Date of Patent: Oct. 11, 2022

(54) VEHICLE-MOUNTED AERIAL DRONE CONTAINER

(71) Applicant: Ford Global Technologies, LLC, Dearborn, MI (US)

(72) Inventors: Oswaldo Perez Barrera, Texcoco (MX); Alvaro Jimenez Hernandez, Miguel Hidalgo (MX)

(73) Assignee: Ford Global Technologies, LLC, Dearborn, MI (US)

( * ) Notice: Subject to any disclaimer, the term of this patent is extended or adjusted under 35 U.S.C. 154(b) by 439 days.

(21) Appl. No.: 16/491,615

(22) PCT Filed: Mar. 8, 2017

(86) PCT No.: PCT/US2017/021402
§ 371 (c)(1),
(2) Date: Sep. 6, 2019

(87) PCT Pub. No.: WO2018/164683
PCT Pub. Date: Sep. 13, 2018

(65) Prior Publication Data
US 2021/0016878 A1 Jan. 21, 2021

(51) Int. Cl.
*B64C 39/02* (2006.01)
*H04W 4/029* (2018.01)
*H04W 4/40* (2018.01)

(52) U.S. Cl.
CPC ............. *B64C 39/02* (2013.01); *H04W 4/029* (2018.02); *H04W 4/40* (2018.02);
(Continued)

(58) Field of Classification Search
CPC ............. B64C 39/02; B64C 2201/042; B64C 2201/12; B64C 2201/208; H04W 4/029; H04W 4/40
See application file for complete search history.

(56) References Cited

U.S. PATENT DOCUMENTS 8,983,682 B1\* 3/2015 Peeters .................. G16H 40/20
701/2
8,989,053 B1\* 3/2015 Skaaksrud ........... G05D 1/0022
370/255
(Continued)

FOREIGN PATENT DOCUMENTS

CN 203280949 U 11/2013
CN 203528817 U \* 4/2014
(Continued)

OTHER PUBLICATIONS

Ford Targets Drone-to-Vehicle Technology to Improve Emergency Services, Commercial Business Efficiency, Ford Media Center, Las Vegas, Jan. 5, 2016 retrieved from Internet URL: https://media.ford.com/content/fordmedia/fna/us/en/news/2016/01/05/ford-targets-drone-to-vehicle-technology.html (2 pages).
(Continued)

*Primary Examiner* — Peter D Nolan
*Assistant Examiner* — Kenneth M Dunne
(74) *Attorney, Agent, or Firm* — Brandon Hicks; Bejin Bieneman PLC

(57) ABSTRACT

A system comprising a computer programmed to identify a connected location of a vehicle at which a user device is connected to a first network and a disconnected location of the vehicle at which the user device is disconnected from the first network. Upon further determining that the user device has not connected to a second network within a first predetermined time, the computer is further programmed to activate an aerial drone container to an open position.

18 Claims, 9 Drawing Sheets

(52) U.S. Cl.
CPC .... *B64C 2201/042* (2013.01); *B64C 2201/12* (2013.01); *B64C 2201/208* (2013.01)

(56) References Cited

U.S. PATENT DOCUMENTS

| | | | |
|---|---|---|---|
| 9,022,322 | B2 | 5/2015 | Westbrook, Sr. |
| 9,051,043 | B1 | 6/2015 | Peeters et al. |
| 9,056,676 | B1* | 6/2015 | Wang ................ G01C 21/3697 |
| 9,463,875 | B2* | 10/2016 | Abuelsaad ............ B64C 39/024 |
| 9,718,564 | B1* | 8/2017 | Beckman .............. B64C 39/024 |
| 9,841,757 | B2* | 12/2017 | Mikan .................. G08G 5/0069 |
| 10,287,014 | B2* | 5/2019 | Erickson ................. B64D 3/00 |
| 10,926,876 | B2* | 2/2021 | Kozak .................... G08G 1/054 |
| 2003/0146854 | A1 | 8/2003 | Jones |
| 2007/0265769 | A1 | 11/2007 | Geelen et al. |
| 2008/0299939 | A1* | 12/2008 | Apodaca ........... H04M 1/72418 455/404.2 |
| 2011/0029229 | A1 | 2/2011 | Hui |
| 2011/0210835 | A1 | 9/2011 | Kondo |
| 2012/0152654 | A1 | 6/2012 | Marcus |
| 2015/0126234 | A1* | 5/2015 | Rodriguez ............. G08B 13/22 455/457 |
| 2015/0321758 | A1* | 11/2015 | Sama, II ............... B64C 39/024 244/63 |
| 2015/0370251 | A1* | 12/2015 | Siegel ...................... G05D 1/00 701/2 |
| 2016/0309337 | A1 | 10/2016 | Priest et al. |
| 2016/0330601 | A1* | 11/2016 | Srivastava ............ B64C 39/024 |
| 2016/0347452 | A1 | 12/2016 | Stanek et al. |
| 2017/0325065 | A1 | 11/2017 | Azam et al. |
| 2018/0039262 | A1* | 2/2018 | Fox .................... H04B 7/18506 |
| 2018/0050800 | A1* | 2/2018 | Boykin .............. H04B 7/18506 |
| 2018/0101173 | A1* | 4/2018 | Banerjee ............ H04N 5/23248 |
| 2018/0321681 | A1* | 11/2018 | Tu ........................ G01C 21/005 |
| 2019/0043370 | A1* | 2/2019 | Mulhall .................. B64D 1/08 |
| 2019/0108472 | A1* | 4/2019 | Sweeney ................ B64C 39/024 |
| 2019/0114564 | A1* | 4/2019 | Ferguson ......... G06Q 10/06312 |
| 2019/0159037 | A1* | 5/2019 | Byrne .................... G08B 25/10 |
| 2019/0266715 | A1* | 8/2019 | Myers ...................... G06N 3/04 |
| 2019/0278296 | A1* | 9/2019 | Perez Barrera ...... G05D 1/0212 |
| 2020/0094957 | A1* | 3/2020 | Sohmshetty .......... B64C 39/024 |
| 2021/0070471 | A1* | 3/2021 | Ahmed ................ G05D 1/0088 |
| 2021/0321277 | A1* | 10/2021 | Murray ............... H04L 41/0677 |

FOREIGN PATENT DOCUMENTS

| | | | | |
|---|---|---|---|---|
| CN | 107333227 A | * | 11/2017 | |
| DE | 102015207979 A1 | * | 11/2016 | ............. G08G 1/166 |
| KR | 20160121862 A | * | 10/2016 | |
| WO | WO-2018190748 A1 | * | 10/2018 | ............. G08B 25/10 |

OTHER PUBLICATIONS

SAR Drones "Search With Aerial RC Multirotor (S.W.A.R.M.)", SAR Drones, UAV Search and Rescue Drones, Nov. 23, 2016, retrieved from Internet URL: http://sardrones.org/ (3 pages).

Non-Final Office Action for related U.S. Appl. No. 16/461,915 as issued by the USPTO dated May 5, 2021.

Transmittal of International Preliminary Report on Patentability dated Sep. 19, 2019, Transmittal of International Search Report and Written Opinion of International Search Authority dated May 23, 2017 regarding International Application No. PCT/US2017/021402 (34 pages).

* cited by examiner

VEHICLE-MOUNTED AERIAL DRONE CONTAINER

BACKGROUND

Unmanned aerial vehicles ("aerial drones") are aircraft capable of flying without a human pilot. Aerial drones can be controlled autonomously, i.e., speed, direction, altitude, etc., can be controlled by a computer rather than by a remote human operator. Aerial drones can be used to support public safety agencies, fire departments, search and rescue operations, wildlife research, scientific research, agriculture, meteorology, aerial mapping, pollution monitoring, and the like.

DETAILED DESCRIPTION

Introduction

Figure 1:
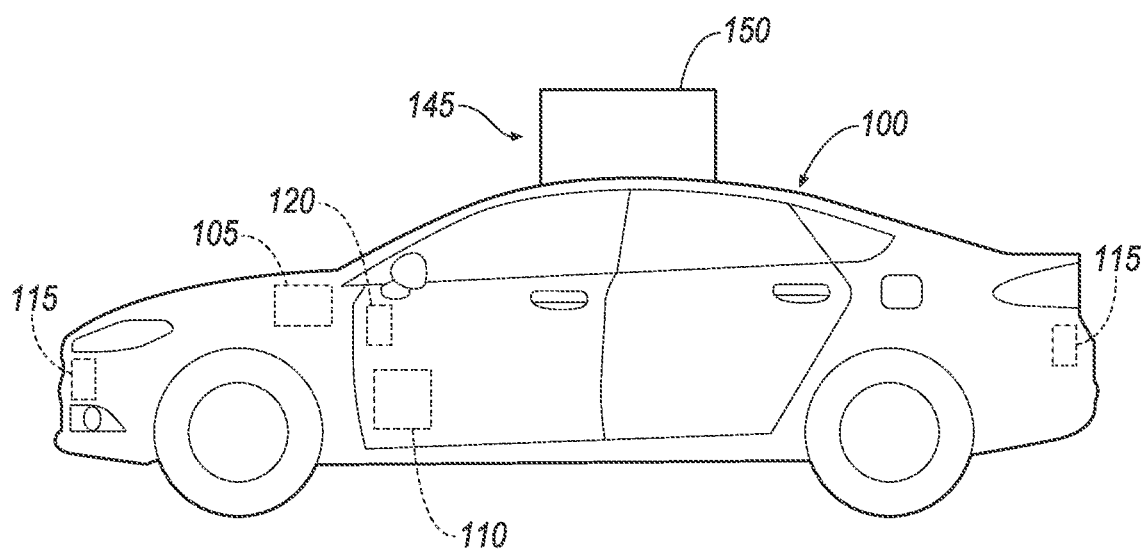
FIG. 1 is a side view of an exemplary vehicle and a container for an unmanned aerial vehicle ("aerial drone") mounted on the vehicle.
Figure 2A:
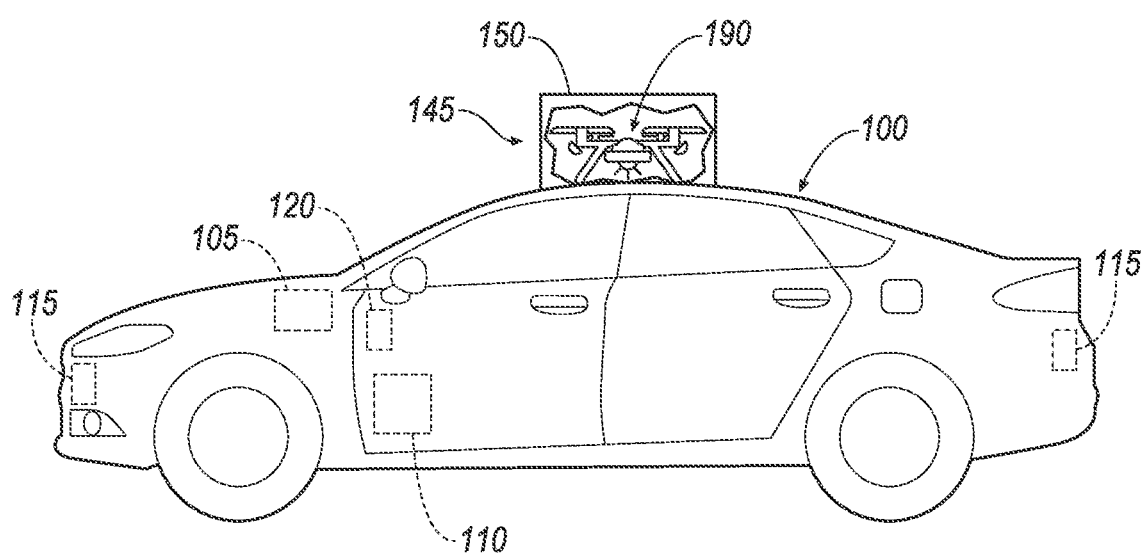
FIG. 2A is a cut-away side view of the container of FIG. 1 with a door of the container in a closed position and an aerial drone disposed in the container.
Figure 2B:
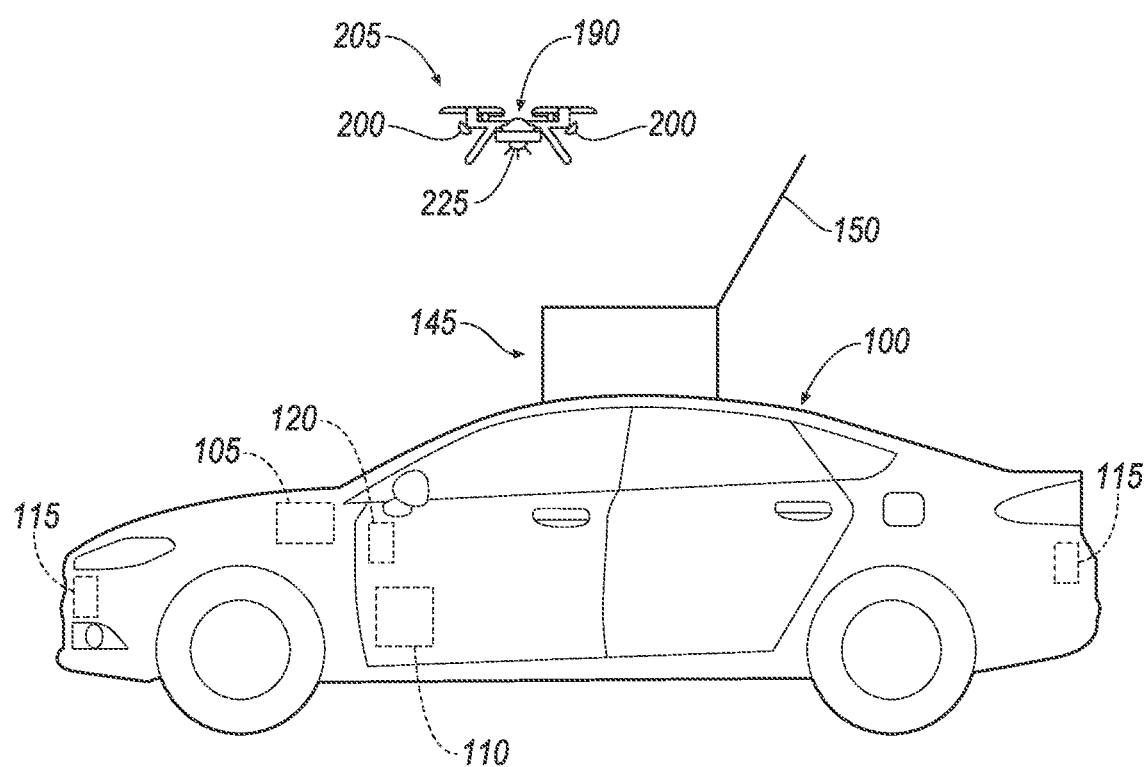
FIG. 2B is a side view of the container with the door in an open position and the aerial drone moving out of the container.

Disclosed herein is a vehicle 100 including a container 145 and an aerial drone 190, as shown in FIGS. 1-2B. A system comprises a computer, such as vehicle computer 105, container computer 155, and aerial drone computer 195, programmed to identify a connected location of the vehicle 100 at which a user device 230 is connected to a first network 135, and a disconnected location of the vehicle 100 at which the user device 230 is disconnected from the first network 135. The first network 135 is typically a wide-area network (WAN), such as a cellular network or the like. The computer is further programmed to determine that the user device 230 has not connected to a second network 140, such as a network included in the vehicle 100 and/or the container 145, within a first predetermined time. Upon determining the user device 230 has not connected to the second network 140 within the first predetermined time, the computer is further programmed to activate an aerial drone 190 container 145 to an open position.

Accordingly, systems and methods disclosed herein solve shortcomings in current technical architectures whereby users needing assistance can be identified and aided. For example, when a user in a wilderness area becomes separated from the vehicle 100, and the area in which the vehicle 100 is located is disconnected from a "cloud" or WAN, such as the first network 135, an aerial drone 190 can be launched to, e.g., travel to the connected location at which connectivity with the first network 135 can be established, and assistance requested.

Disclosed is a method comprising identifying a connected location of a vehicle 100 at which a user device 230 is connected to a first network 135, and a disconnected location of the vehicle 100 at which the user device 230 is disconnected from the first network 135; and upon further determining that the user device 230 has not connected to a second network 140 within a first predetermined time, activating an aerial drone 190 container 145 to an open position.

The method can further comprise detecting a plurality of locations at which the user device 230 is connected to the first network 135 while the vehicle 100 is moving, and designating as the connected location a most recent one of the plurality of locations.

The method can further comprise detecting the plurality of locations periodically.

The method can further comprise detecting a reconnection location at which the user device 230 reconnects with the first network 135 after losing the connection with the first network 135 for the second predetermined time; and then continuing to detect the plurality of locations.

The method can further comprise determining that an aerial drone battery 210 can provide electrical energy for the aerial drone 190 to travel from the disconnected location to the connected location; transmitting a user device route, and the connected location, the disconnected location, and a user device destination to the aerial drone; and instructing the aerial drone to travel to the connected location to transmit a notification.

The method can further comprise determining that the aerial drone battery 210 can provide electrical energy for the aerial drone to travel from the connected location to the disconnected location after transmitting the notification; and instructing the aerial drone 190 to travel from the connected location to the disconnected location after transmitting the notification.

The method can further comprise upon determining the aerial drone battery 210 cannot provide electrical energy for the aerial drone 190 to travel from the disconnected location to the connected location, determining that the aerial drone battery 210 can provide electrical energy for the aerial drone 190 to travel from the disconnected location to a user device 230 destination, from the user device 230 destination along a user device 230 route to the disconnected location and detect a user associated with a user device 230 while travelling along the user device 230 route; transmitting the disconnected location, the user device 230 destination and the user device 230 route to the aerial drone 190; and instructing the aerial drone 190 to travel to the user device 230 destination, from the user device 230 destination along the user device 230 route to the disconnected location and detect the user associated with the user device 230 while travelling along the user device 230 route.

The method can further comprise upon determining that the aerial drone battery 210 cannot provide electrical energy for the aerial drone 190 to travel from the disconnected location to a user device 230 destination, from the user device 230 destination along a user device 230 route to the disconnected location and detect a user associated with a user device 230 while travelling along the user device 230 route, determining a distance the aerial drone 190 can travel from the disconnected location along the user device 230 route and detect the user associated with the user device 230 such that the aerial drone 190 can return to the disconnected location from the distance; transmitting the user device 230 route to the aerial drone 190; and instructing the aerial drone 190 to travel to and from the distance along the user device 230 route and detect the user associated with the user device 230.

When the container 145 includes a battery charger 170 electrically coupled to a battery, such as container battery 175, and the aerial drone 190 includes a chargeable aerial drone battery 210, the method can further comprise determining that the aerial drone 190 is in the container 145; activating the battery charger 170 to charge the aerial drone battery 210; and deactivating the battery charger 170 upon determining that the aerial drone battery 210 is charged.

The method can further comprise that upon detecting that the aerial drone 190 has returned to the disconnected location, determining that the aerial drone 190 is in the container 145; and then activating the battery charger 170 to charge the aerial drone battery 210.

Further disclosed is a system comprising a computer programmed to execute any of the above method steps. Yet further disclosed is a vehicle 100, a container 145, and an aerial drone 190, each including a computer 105, 155, and 195, respectively. Yet further disclosed is a computer program product, comprising a computer readable medium storing instructions executable by a compute processor, to execute any of the above method steps.

Exemplary System Elements

Figure 3A:
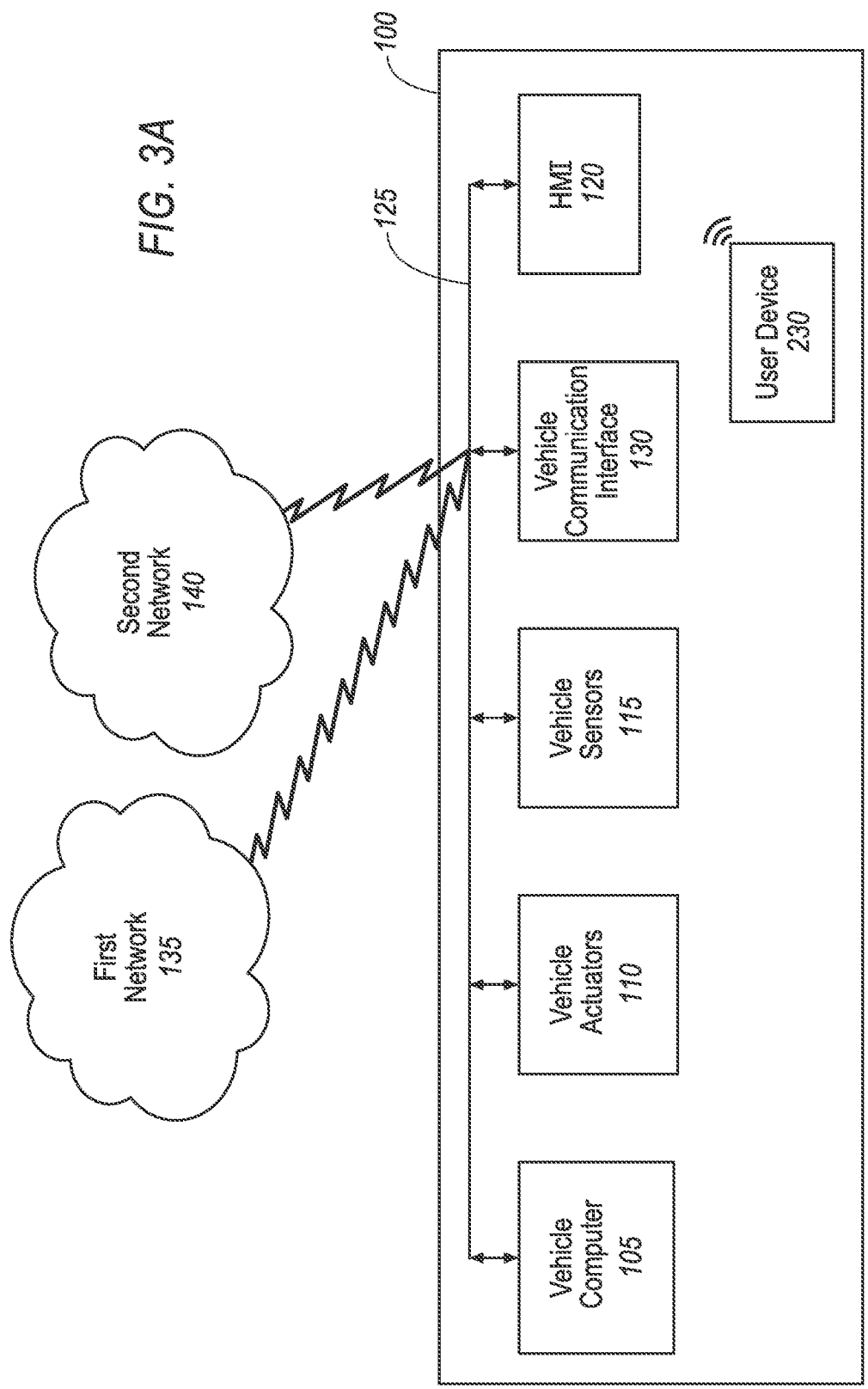
FIG. 3A is a block diagram of the example vehicle.

FIG. 3A is a block diagram of components of the vehicle 100. The vehicle 100 may be powered in a variety of known ways, e.g., with an electric motor and/or internal combustion engine. The vehicle 100 can include any automobile such as a car, a truck, a sport utility vehicle, a crossover vehicle, a van, a minivan, etc. The vehicle 100 may include a vehicle computer 105, vehicle actuators 110, vehicle sensors 115, an HMI 120, a vehicle communication network 125, and a vehicle communication interface 130.

The vehicle computer 105 includes a processor and a memory such as are known. The memory includes one or more forms of computer-readable media, and stores instructions executable by the vehicle computer 105 for performing various operations, including as disclosed herein.

The vehicle computer 105 may operate the vehicle 100 in an autonomous mode, a semi-autonomous mode, and a non-autonomous mode. For purposes of this disclosure, an autonomous mode is defined as one in which each of a vehicle's propulsion, steering, and braking are controlled by a vehicle computer; in a semi-autonomous mode, a vehicle computer controls one or two of the vehicle's propulsion, steering, and braking; in a non-autonomous mode, a human operator controls the vehicle's propulsion, steering, and braking.

The vehicle computer 105 may include programming to operate one or more systems of the vehicle 100, e.g., propulsion (e.g., control of acceleration in the vehicle 100 by controlling one or more of an internal combustion engine, electric motor, hybrid engine, etc.), steering, braking, climate control, interior and/or exterior lights, etc. The vehicle computer 105 can further determine whether and when the vehicle computer 105 is to control the operations of the vehicle 100 as opposed to a human operator. Additionally, the vehicle computer 105 may be programmed to determine whether and when a human operator is to control such operations.

The vehicle computer 105 can include or be communicatively coupled to, e.g., more than one processor, such as controllers or the like, included in the vehicle 100 for monitoring and/or controlling various controllers of the vehicle 100, such as a powertrain controller, a brake controller, a steering controller, etc.

The vehicle computer 105 is generally arranged for communications on a vehicle communication network 125, which can include a bus in the vehicle 100, such as a controller area network (CAN) or the like, and/or other wireless and/or wired networks or buses, e.g., Ethernet, Local Interconnect Network (LIN), or other wired communication protocols.

Via the vehicle communication network 125, the vehicle computer 105 may transmit data to and receive data from components of the vehicle 100, including the vehicle actuators 110, the vehicle sensors 115, the HMI 120, the vehicle communication interface 130, etc. In cases where the vehicle computer 105 comprises multiple components, the vehicle communication network 125 may be used for communications between the components represented as the vehicle computer 105 in this disclosure.

The vehicle actuators 110 of the vehicle 100 are implemented via circuits, chips, or other electronic and/or mechanical components that can actuate various vehicle subsystems in accordance with appropriate data transmissions, as is known. The vehicle actuators 110 may be used to control vehicle systems such as acceleration, steering, and braking of the vehicle 100.

The vehicle sensors 115 of the vehicle 100 may include a variety of devices known to detect, provide and transmit data. The data may be received by the vehicle computer 105, the vehicle communication interface 130, etc., via the vehicle communication network 125 of the vehicle 100 (or other suitable interfaces such as are known).

The vehicle sensors 115 can include one or more cameras, radar, infrared, and/or LIDAR sensors disposed in and/or on the vehicle 100 transmitting data that can, e.g., encompass an exterior of the vehicle 100. For example, a LIDAR sensor can be disposed on the vehicle 100 and can transmit object data, including data relating to relative locations, sizes, and shapes of objects, such as other vehicles surrounding the vehicle 100. The vehicle computer 105 may receive the object data transmitted via the vehicle communication network 125 and operate the vehicle 100 in an autonomous and/or semi-autonomous mode based on, among other things, the received object data.

The vehicle sensors 115 can also include a vehicle Global Positioning System (GPS) sensor 115. The vehicle GPS sensor 115 can detect, provide and transmit data, such as location data, i.e., geographic coordinates, etc., of the vehicle 100, to the vehicle computer 105 via the vehicle communication network 125. Additionally, or alternatively, the vehicle GPS sensor 115 can detect and transmit data, including the locations of the vehicle 100, to a container computer 155 via, e.g., the vehicle communication interface 130, as further discussed below.

The HMI 120 can include a touchscreen, an interactive voice response (IVR) system, and other input/output mechanisms such as are known, and can receive input data from an occupant of the vehicle 100 and output data to the occupant. The HMI 120 may have, e.g., a touchscreen including a "soft key" or the like, and/or a physical button or the like, to transmit data to the vehicle computer 105.

For example, the occupant may select the autonomous mode of operation by inputting a requested mode of operation via the HMI 120. Moreover, the HMI 120 may be configured to present information to the occupant, such as the anticipated route of the vehicle 100, etc. The HMI 120 may be in a passenger compartment of the vehicle 100.

The vehicle 100 can include a vehicle communication interface 130. The vehicle communication interface 130 can include an antenna, circuits, chips, and/or other electronic components. For example, the vehicle communication interface 130 can include known electronic circuitry such as a wireless signal transmitter, a wireless signal receiver, and an amplifier circuit to boost outgoing and incoming wireless communications.

The vehicle communication interface 130 can transmit data to and receive data from components of the vehicle 100, such as the vehicle computer 105, the vehicle actuators 110, the vehicle sensors 115, and the HMI 120. The vehicle communication interface 130 may transmit data to and receive data from the vehicle components in accordance with any number of wireless communication protocols, such as Bluetooth®, Bluetooth® Low Energy, WiFi, NFC, etc. Additionally, or alternatively, the vehicle communication interface 130 may transmit data to and receive data from the vehicle components over the vehicle communication network 125.

The vehicle communication interface 130 can send and receive communications via the first and the second networks 135, 140. The first network 135 is a wireless communication network (e.g., one or more of cellular, WiMAX, satellite, microwave, and radio frequency). The first network 135 is sometimes referred to as a WAN because it is intended for communications over wide geographic distances, e.g., many miles, even hundreds or thousands of miles.

The second network 140 is also a wireless communication network (e.g., Bluetooth®, Bluetooth® Low Energy, WiFi, Near-Field Communication (NFC), etc.). The second network 140 is generally "local" to the vehicle 100 and/or the container 145, meaning that it is available only for wireless communication in and/or very near the vehicle 100 and/or the container 145, e.g., 50 meters or so. As discussed below, the second network 140 represents one or more wireless mechanisms by which the vehicle 100, the container 145, the aerial drone 190, and the user device 230, may transmit data to and receive data from each other.

As discussed above, the vehicle communication interface 130 can communicate via the second network 140 with electronic devices, e.g., the container computer 155 and a container communication interface 185, an aerial drone computer 195 and an aerial drone communication interface 220, the user device 230, etc. The electronic devices may be external to the vehicle 100.

Additionally, or alternatively, the vehicle communication interface 130 can communicate with, e.g., the container computer 155, the container communication interface 185, and/or the user device 230 using a wired network, e.g., via a Universal Serial Bus (USB), a controller area network (CAN), Ethernet, a Mobile High Definition Link (MHL), a High Definition Multimedia Interface (HDMI), a Local Interconnect Network (LIN), etc.

The vehicle computer 105 can detect when the user device 230 is connected to the first network 135. For example, when the user device 230 is connected to the vehicle communication interface 130 via the second network 140, the vehicle communication interface 130 can transmit data to the vehicle computer 105 over the vehicle communication network 125 indicating that the user device 230 is connected to the first network 135. Additionally, or alternatively, the vehicle communication interface 130 can transmit data via the second network 140 to the container communication interface 185 and the container computer 155 (via, e.g., a container communication network 180, as further discussed below), indicating that the user device 230 is connected to the first network 135.

The vehicle computer 105 can further detect when the user device 230 disconnects from the first network 135. For example, when the user device 230 is connected to the vehicle communication interface 130 via the second network 140, the vehicle communication interface 130 can transmit data to the vehicle computer 105 over the vehicle communication network 125 indicating that the user device 230 is disconnected from the first network 135. Additionally, or alternatively, the vehicle communication interface 130 can transmit data via the second network 140 to the container communication interface 185 and the container computer 155 (via, e.g., the container communication network 180), indicating that the user device 230 is connected to the first network 135.

The vehicle computer 105 can further detect when the user device 230 reconnects to the first network 135 after disconnecting from the first network 135. For example, when the user device 230 is connected to the vehicle communication interface 130 via the second network 140, the vehicle communication interface 130 can transmit data to the vehicle computer 105 over the vehicle communication network 125 indicating that the user device 230 is reconnected to the first network 135. Additionally, or alternatively, the vehicle communication interface 130 can transmit data via the second network 140 to the container communication interface 185 and the container computer 155 (via, e.g., the container communication network 180), indicating that the user device 230 is reconnected to the first network 135.

The vehicle computer 105 can further detect when the user device 230 is connected to the second network 140. For example, when the user device 230 is connected to the vehicle communication interface 130 via the second network 140, the vehicle communication interface 130 can transmit data to the vehicle computer 105 over the vehicle communication network 125 indicating that the user device 230 is connected to the second network 140. Additionally, or alternatively, the vehicle communication interface 130 can transmit data via the second network 140 to the container communication interface 185 and the container computer 155 (via, e.g., the container communication network 180), indicating that the user device 230 is connected to the second network 140.

The vehicle computer 105 can further detect when the user device 230 disconnects from the second network 140. For example, the vehicle communication interface 130 can transmit data to the vehicle computer 105 over the vehicle communication network 125 indicating that the user device 230 is disconnected from the second network 140. Additionally, or alternatively, the vehicle communication interface 130 can transmit data via the second network 140 to the container communication interface 185 and the container computer 155 (via, e.g., the container communication network 180), indicating that the user device 230 is disconnected from the second network 140.

The vehicle computer 105 can further detect when the user device 230 reconnects to the second network 140 after disconnecting from the second network 140. For example, when the user device 230 is in communication with the vehicle communication interface 130 via the second network 140, the vehicle communication interface 130 can transmit data to the vehicle computer 105 over the vehicle communication network 125 indicating that the user device 230 is reconnected to the second network 140. Additionally, or alternatively, the vehicle communication interface 130 can transmit data via the second network 140 to the container communication interface 185 and the container computer 155 (via, e.g., the container communication network 180), indicating that the user device 230 is reconnected to the second network 140.

Container

As shown in FIGS. 1 and 2A-2B, the container 145 may be mounted on the vehicle 100, e.g., a roof of the vehicle 100. The container 145 can store and transport the aerial drone 190, including while the vehicle 100 is moving. The container 145 can have a variety of shapes, such as rectangular, circular, etc. The container 145 can also have various sizes, e.g., small, medium, and large, to accommodate storage and transportation of various types of aerial drones.

The container 145 can include an opening sized to deploy the aerial drone 190, e.g., to allow the aerial drone to move out of and into the container 145. The opening can be covered by a door 150. For example, as shown in FIG. 2A, when the container 145 is in a closed position, the door 150 of the container 145 is closed. As shown in FIG. 2B, when the container 145 is in an open position, the door 150 of the container 145 is open, and the aerial drone 190 can deploy into and out of the container 145 via, e.g., the opening in the container 145.

Figure 3B:
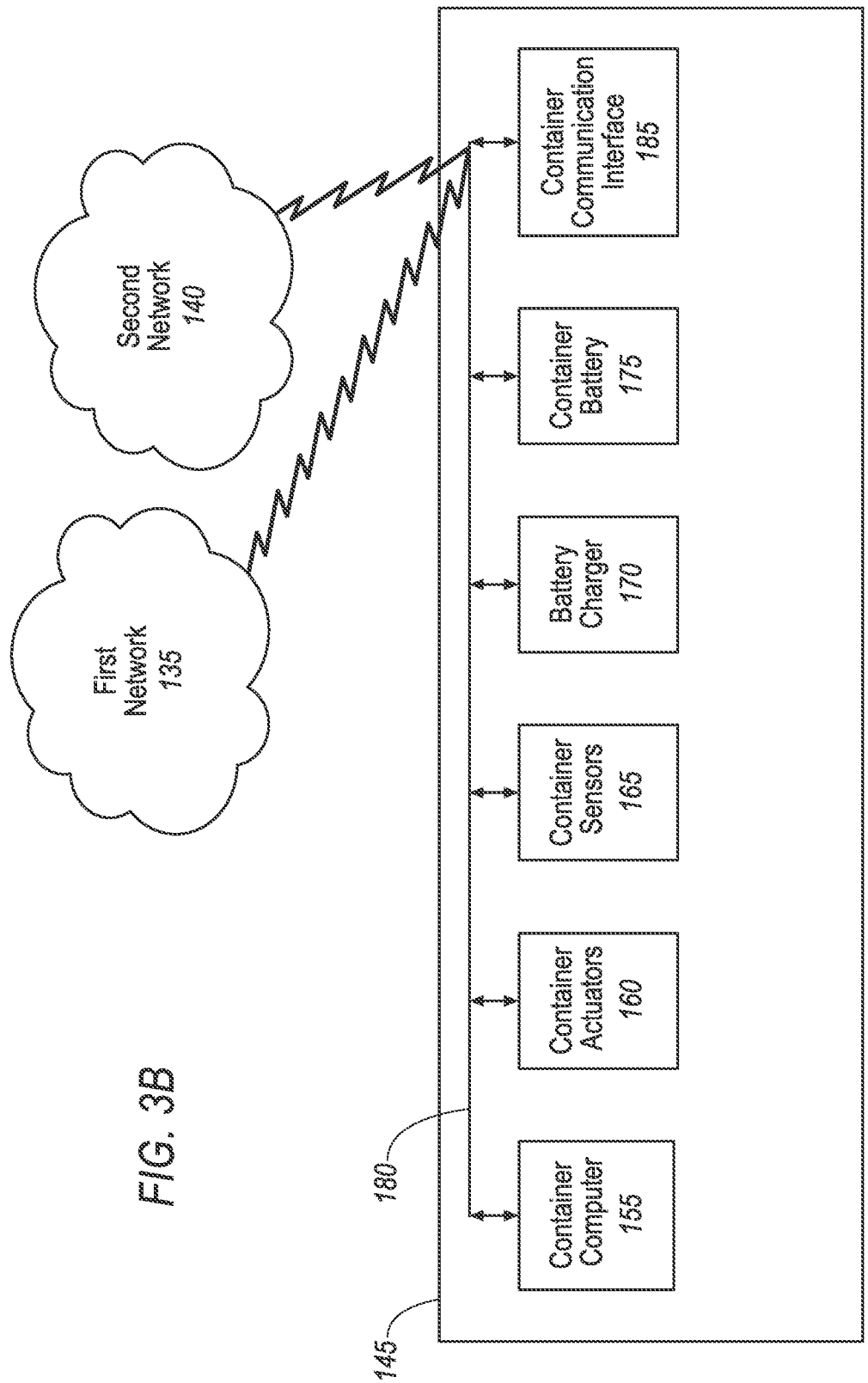
FIG. 3B is a block diagram of the example container.

FIG. 3B is a block diagram of components of the container 145. The container 145 can include the container computer 155, container actuators 160, container sensors 165, a battery charger 170, a container battery 175, the container communication network 180, and the container communication interface 185.

The container computer 155 includes a processor and a memory such as are known. The memory includes one or more forms of computer-readable media, and stores instructions executable by the container computer 155 for performing various operations, including as disclosed herein.

The container computer 155 can include or be communicatively coupled to, e.g., more than one processor, e.g., sensors, actuators, and the like included in the container 145. The container computer 155 is generally arranged for communications on the container communication network 180, which can include a bus in the container 145, and/or other wired and/or wireless mechanisms such as discussed above for the vehicle 100.

Via the container communication network 180, the container computer 155 may transmit data to and receive data from components in the container 145, including the container actuators 160, the container sensors 165, the battery charger 170, the container battery 175, the container communications interface 185, etc. In cases where the container computer 155 comprises multiple components, the container communication network 180 may be used for communications between the components represented as the container computer 155 in this disclosure.

The container actuators 160 of the container 145 are implemented via circuits, chips, or other electronic and/or mechanical components that can actuate various container 145 systems with appropriate data transmissions, as is known. For example, the container actuators 160 can include a container door actuator 160, e.g., an electromechanical actuator such as solenoids or other types of electromechanical devices that convert electrical signals into motion, to open and close the door 150 of the container 145. In this way, the container 145 can move from the closed position to the open position and from the open position to the closed position, as described above.

The container actuators 160 can also include a charger actuator 160. For example, upon determining that the aerial drone 190 is in the container 145, the container computer 155 can transmit data via the container communication network 180 to the charger actuator 160 to activate the battery charger 170 to charge an aerial drone battery 210. Upon determining that the aerial drone battery 210 is charged, the container computer 155 can transmit data via the container communication network 180 to the charger actuator 160 to deactivate the battery charger 170.

The container sensors 165 of the container 145 may include a variety of devices known to detect, provide and transmit data. The data transmitted may be received by, e.g., the container computer 155, via the container communication network 180. For example, the container sensors 165 can include a load sensor 165 to detect when the aerial drone 190 is in the container 145.

The container battery 175 can provide electrical energy for operating electrical components associated with the container 145, such as the container computer 155, the container actuators 160 (e.g., the container door actuator 160 and charger actuator 160), the container sensors 165 (e.g., the load sensor 165), the container communication network 180, the container communication interface 185, etc.

In an example shown in FIG. 3B, the container battery 175 can be disposed inside the container 145. It should be appreciated, however, that the container battery 175 can also be disposed on and/or outside the container 145. In addition to the container battery 175 being in electrical communication with the electrical components discussed above, the container battery 175 can also be in electrical communication with other power sources. For example, the container battery 175 can be in electrical communication with a battery of the vehicle 100. In this way, the vehicle 100 battery can charge the container battery 175 when, e.g., the vehicle 100 is operating.

The container battery 175 can provide electrical energy to charge the aerial drone battery 210. For example, as discussed above, the container 145 can include container sensors 165, such as the load sensor 165, and the battery charger 170. The battery charger 170 can be electrically coupled to, e.g., the container battery 175. In this way, the container computer 155 can be programmed to activate the battery charger 170 via the charger actuator 160 to charge the aerial drone battery 210 upon determining the aerial drone 190 is in the container 145. The container computer 155 can be further programmed to deactivate the battery charger 170 via the charger actuator 160 upon determining the aerial drone battery 210 is charged.

The aerial drone battery 210 can be wirelessly charged using known inductive charging techniques. For example, the battery charger 170 can include an inductive charging circuit that supports inductive charging. As discussed above, the battery charger 170 is connected to a power source, e.g., the container battery 175, the vehicle 100 battery, etc., and can transfer electrical energy to the aerial drone battery 210 when the aerial drone 190 is in the container 145.

The container 145 can include the container communication interface 185. The container communication interface 185 can include an antenna, circuits, chips, and/or other electronic components. For example, the container communication interface 185 can include known electronic circuitry such as a wireless signal transmitter, a wireless signal receiver, and an amplifier circuit to boost outgoing and incoming wireless signals.

Alternatively, the container 145 could be a component of the vehicle 100 without a container communication interface 185.

The container communication interface 185 can transmit data to and receive data from components of the container 145, such as the container computer 155, the container actuators 160, the container sensors 165, the battery charger 170 and the container battery 175. The container communication interface 185 may transmit data to and receive data from the container components in accordance with any number of wireless communication protocols such as Bluetooth®, Bluetooth® Low Energy, WiFi, NFC, etc. Additionally, or alternatively, the container communication interface 185 may transmit data to and receive data transmissions from the container components over the container communication network 180 via a bus, Ethernet, Local Interconnect Network (LIN), or other wired communication protocols.

The container communication interface 185 can send and receive communications via the first and second networks 135, 140, e.g., in accordance with instructions from the container computer 155. As discussed above, the container communication interface 185 can communicate via the second network 140 with electronic devices, e.g., the vehicle computer 105 and the vehicle communication interface 130, the aerial drone computer 195 and an aerial drone communication interface 220, the user device 230, etc. The electronic devices may be external to the container 145. Additionally, or alternatively, the container communication interface 185 can communicate with, e.g., the vehicle computer 105, the vehicle communication interface 130, and the user device 230 using a wired network, e.g., via a Universal Serial Bus (USB), Ethernet, a Mobile High Definition Link (MHL), a High Definition Multimedia Interface (HDMI), a Local Interconnect Network (LIN), etc.

In this way, the container communication interface 185 can receive transmissions of the locations of the vehicle 100 detected by, e.g., the vehicle GPS sensor 115. For example, as discussed above, the vehicle communication interface 130 can transmit the locations to the container communication interface 185 via the second network 140, and the container communication interface 185 can transmit the locations to the container computer 155 via the container communication network 180.

The container computer 155 can detect connections/disconnections between the user device 230 and the first and second networks 135, 140 in a like manner as the vehicle computer 105, as discussed above.

Aerial Drone

As shown in FIGS. 2A-B, the aerial drone 190 can be stored and transported in the container 145, including when the container 145 is mounted on the vehicle 100. When the container is in the open position as shown in FIG. 2B, the aerial drone 190 can deploy, i.e., launch from the vehicle 100, and move out of and/or into the container 145.

Figure 3C:
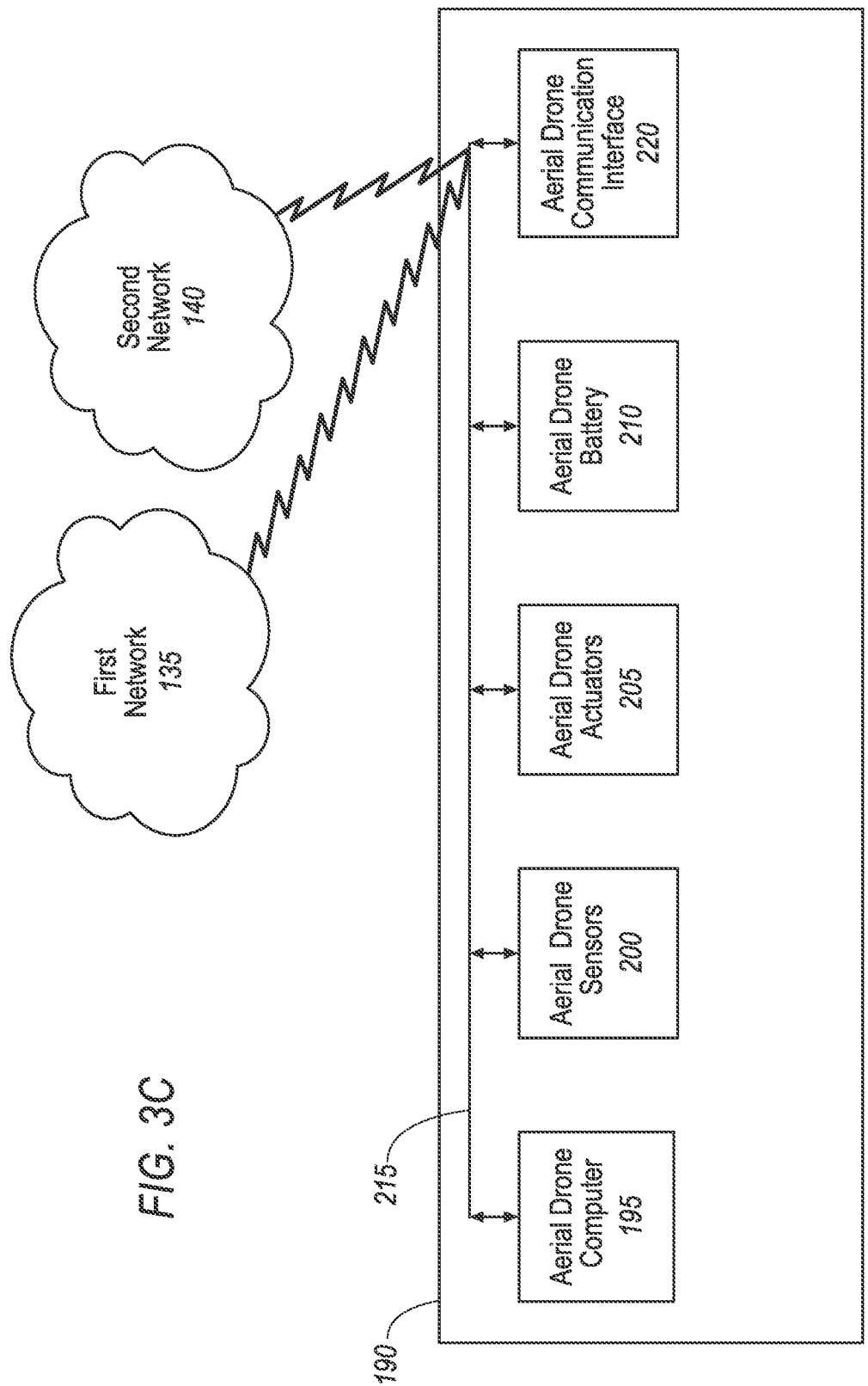
FIG. 3C is a block diagram of the example aerial drone.

FIG. 3C is a block diagram of components of the aerial drone 190. The aerial drone 190 can include the aerial drone computer 195, aerial drone sensors 200, aerial drone actuators 205, the aerial drone battery 210, an aerial drone communication network 215, the aerial drone communication interface 220, and an aerial drone light 225.

The aerial drone computer 195 includes a processor and a memory such as are known. The memory includes one or more forms of computer-readable media, and stores instructions executable by the aerial drone computer 195 for performing various operations, including as disclosed herein.

The aerial drone computer 195 is generally arranged for communications on the aerial drone communication network 215 of the aerial drone 190. The aerial drone communication network 215 can include a bus in the aerial drone 190, and/or other wired and/or wireless communication mechanisms, such as discussed above.

Via the aerial drone communication network 215, the aerial drone computer 195 may transmit data to and receive data from the aerial drone components, including, e.g., the aerial drone sensors 200, the aerial drone actuators 205, the aerial drone battery 210, the aerial drone communication interface 220, etc. In cases where the aerial drone computer 195 comprises multiple devices, the aerial drone communication network 215 may be used for communications between the components represented as the aerial drone computer 195 in this disclosure.

The aerial drone actuators 205 are implemented via circuits, chips, or other electronic and/or mechanical components that can actuate various aerial drone systems with appropriate control signals, as is known.

The aerial drone actuators 205 can include propeller actuators 205. The propeller actuators 205 can actuate propellers of the aerial drone 190 to fly the aerial drone 190 in accordance with signals output to the propeller actuators 205.

The aerial drone sensors 200 may include a variety of devices known to provide data. The data may be received by, e.g. the aerial drone computer 195 via the aerial drone communication network 215.

For example, the aerial drone sensors 200 can include one or more cameras, radar, infrared, and/or LIDAR sensors disposed in and/or on the aerial drone 190 providing data that can, e.g., encompass an exterior of the aerial drone 190. For example, a LIDAR sensor 200 can be disposed on the aerial drone 190, and may provide object data including relative locations, sizes, and shapes of objects, such as objects surrounding the aerial drone 190. The aerial drone computer 195 may receive the object data and operate the aerial drone 190 in an autonomous mode based at least in part on the received object data.

The aerial drone sensors 200 can also include an aerial drone GPS sensor 200. The aerial drone GPS sensor 200 can allow the aerial drone 190 to fly to, hover at, and return from various locations.

The aerial drone sensors 200 can also include one or more camera sensors 200. The camera sensors 200 can capture images of an area near the aerial drone 190. The camera sensors 200 may be mounted on a housing of the aerial drone 190. The aerial drone light 225 can also be mounted on the housing. The aerial drone computer 195 can activate the camera sensors 200 and the aerial drone light 225 to detect potential items of interest.

For example, when the camera sensors 200 detect a potential item of interest, e.g., a user associated with a user device 230, the camera sensors 200 can output a signal to the aerial drone computer 195 via, e.g., the aerial drone communication network 215. Upon determining that the potential item of interest has been detected, the aerial drone computer 195 can instruct the propeller actuators 205 to actuate the propellers of the aerial drone 190 to hover over and/or to move closer to the potential item of interest. When hovering over and/or moving closer to the potential item of interest, the aerial drone computer 195 can instruct the aerial drone camera sensors 200 to capture image(s) of the potential item of interest.

The aerial drone computer 195 can compare the captured images with, e.g., a stored image(s) of the user, and determine whether the captured image(s) matches the stored image(s). Upon determining that the captured image(s) matches the stored image(s), the aerial drone computer 195 can detect and store location data of the potential item of interest from the aerial drone GPS sensor 200. The location data includes the coordinates of the potential item of interest, and routes to the potential item of interest from locations to which the aerial drone has previously traveled and/or may subsequently travel, etc.

The aerial drone battery 210 provides electrical energy for operating electrical components associated with the aerial drone 190, such as the aerial drone computer 195, the aerial drone sensors 200 (e.g., the aerial drone LIDAR 200, the aerial drone GPS sensor 200, and the camera sensors 200), the aerial drone actuators 205 (e.g., the propeller actuators 205), the aerial drone communication network 215, the aerial drone communication interface 220, the aerial drone light 225, etc.

As discussed above, the container battery 175 and/or other power sources (e.g., the vehicle battery) may provide electrical energy to charge the aerial drone battery 210 when the aerial drone 190 is in the container 145.

The aerial drone 190 can include the aerial drone communication interface 220. The aerial drone communication interface 220 can include an antenna, circuits, chips, and/or other electronic components. For example, the aerial drone communication interface 220 can include known electronic circuitry such as a wireless signal transmitter, a wireless signal receiver, and an amplifier circuit to boost outgoing and incoming wireless signals.

The aerial drone communication interface 220 can transmit data to and receive data from components of the aerial drone 190, such as the aerial drone computer 195, the aerial drone sensors 200, the aerial drone actuators 205, the aerial drone battery 210, the aerial drone light 225, etc.

The aerial drone communication interface 220 may transmit data to and receive data from the aerial drone components in accordance with any number of wireless communication protocols such as Bluetooth®, Bluetooth® Low Energy, WiFi, NFC, etc. Additionally, or alternatively, the aerial drone communication interface 220 may communicate with the aerial drone components over the aerial drone communication network 215, e.g., via a bus, Ethernet, Local Interconnect Network (LIN), or other wired communication protocols.

The aerial drone communication interface 220 can send and receive communications via the first and second networks 135, 140, e.g., in accordance with instructions from the aerial drone computer 195. For example, the aerial drone communication interface 220 can communicate via the second network 140 with various electronic devices, e.g., the vehicle computer 105 and the vehicle communication interface 130, the container computer 155 and the container communication interface 185, the user device 230, etc.

In this way, the aerial drone communication interface 220 can receive the locations of the vehicle 100 via the second network 140. For example, the vehicle communication interface 130 and/or the container communication interface 185 can transmit the locations of the vehicle 100 to the aerial drone communication interface 220 via the second network 140. The aerial drone communication interface 220 can send the locations of the vehicle 100 to the aerial drone computer 195 via the aerial drone communication network 215. The aerial drone computer 195 can be programmed to store the locations of the vehicle 100 in, e.g., the memory of the aerial drone computer 195.

The aerial drone communication interface 220 can further transmit a notification via the first network 135. The notification can include, e.g., an identity of a user associated with a user device 230, as further discussed below.

User Device

The user device 230 can be any variety of mobile computing devices that include a processor, a memory, an input mechanism, and communication capabilities, such as a personal computer (e.g., a laptop computer, a tablet, etc.), a smartphone, a personal digital assistant, a portable media player, wearable devices such as smart watches, and/or any other suitable mobile computing device.

The user device 230 can include a user device communication interface. The user device communication interface can include an antenna, circuits, chips, and/or other electronic components. For example, the user device communication interface can include known electronic circuitry such as a wireless signal transmitter, a wireless signal receiver, and an amplifier circuit to boost outgoing and incoming wireless signals. The user device communication interface can be programmed to send and receive communications via the first and second networks 135, 140.

The user device 230 can transmit data via the second network 140 to the vehicle computer 105, the container computer 155, and the aerial drone computer 195, as discussed above. In addition, the user device 230 can receive data transmissions from the vehicle computer 105, the container computer 155, and the aerial drone computer 195 via the second network 140, as also discussed above.

For example, using the input mechanism of the user device 230, such as a keyboard, a touchscreen, buttons, a microphone, etc., the user of the user device 230 can input a user device 230 route, a user device 230 destination, etc., to the user device 230. The user can also input the first predetermined time to the user device 230, i.e., a time period to which a time the user device 230 is disconnected from the second network 140 can be compared.

The user device 230 route can be a path the user intends to take with the user device 230 to the user device 230 destination from a disconnected location. The disconnected location is a current location of the vehicle 100 at which the user device 230 cannot connect to the first network 135. The first predetermined time, e.g., two hours, can be an amount of time the user anticipates it will take to travel to and from the user device 230 destination and the disconnected location. The user device 230 can transmit data indicating the user device 230 route, the user device 230 destination, and the first predetermined time to the vehicle computer 105, the container computer 155, and the aerial drone computer 195.

The user device 230 can also transmit certain identifiers that are unique (or substantially unique) to each user device 230. For example, the identifiers can include a MAC Address, an International Mobile Equipment Identifier (IMEI), an Electronic Serial Number (ESN), a Mobile Equipment Identifier (MEID), a Mobile Directory Number (MDN), a Mobile Identification Number (MIN), a Mobile Subscription Identification Number (MSIN), an International Mobile Subscriber Identification number (IMSI), a static or dynamic IP address, an email address, or the like.

The vehicle computer 105, the container computer 155, and the aerial drone computer 195 can be programmed to store identifiers for one or more user devices 230, and further store identifiers as associated with respective users of the vehicle 100. For example, identifiers associated with user devices 230 of the users can be stored in the memories of the vehicle computer 105, the container computer 155, and the aerial drone computer 195. In this way, when the user device 230 having identifiers associated with users is within range of the second network 140, the vehicle computer 105, the container computer 155, and the aerial drone computer 195 can associate those user devices 230, as well as communications from the user device 230, with the user. In addition, the vehicle computer 105, the container computer 155, and the aerial drone computer 195 can be programmed to transmit communications to the user device 230 associated with the user.

As shown in FIG. 3A, the user device 230 may be in a passenger compartment of the vehicle 100. It should be understood, however, that an occupant of the vehicle 100 can take the user device 230 from the vehicle 100 when the occupant exits the vehicle 100.

Exemplary Process Flow

Figure 4A:
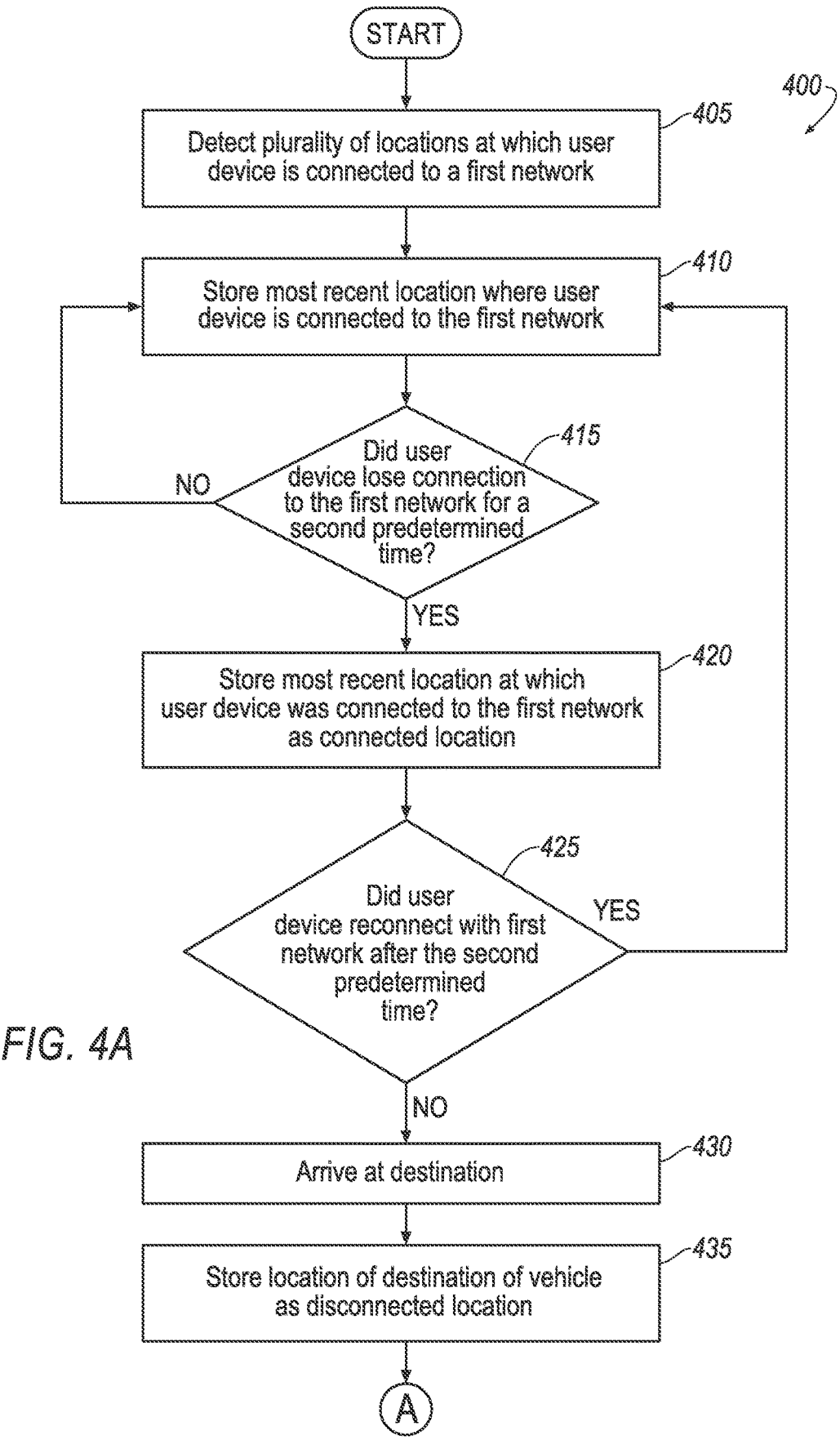
FIGS. 4A-C are a flowchart of an exemplary process.
Figure 4B:
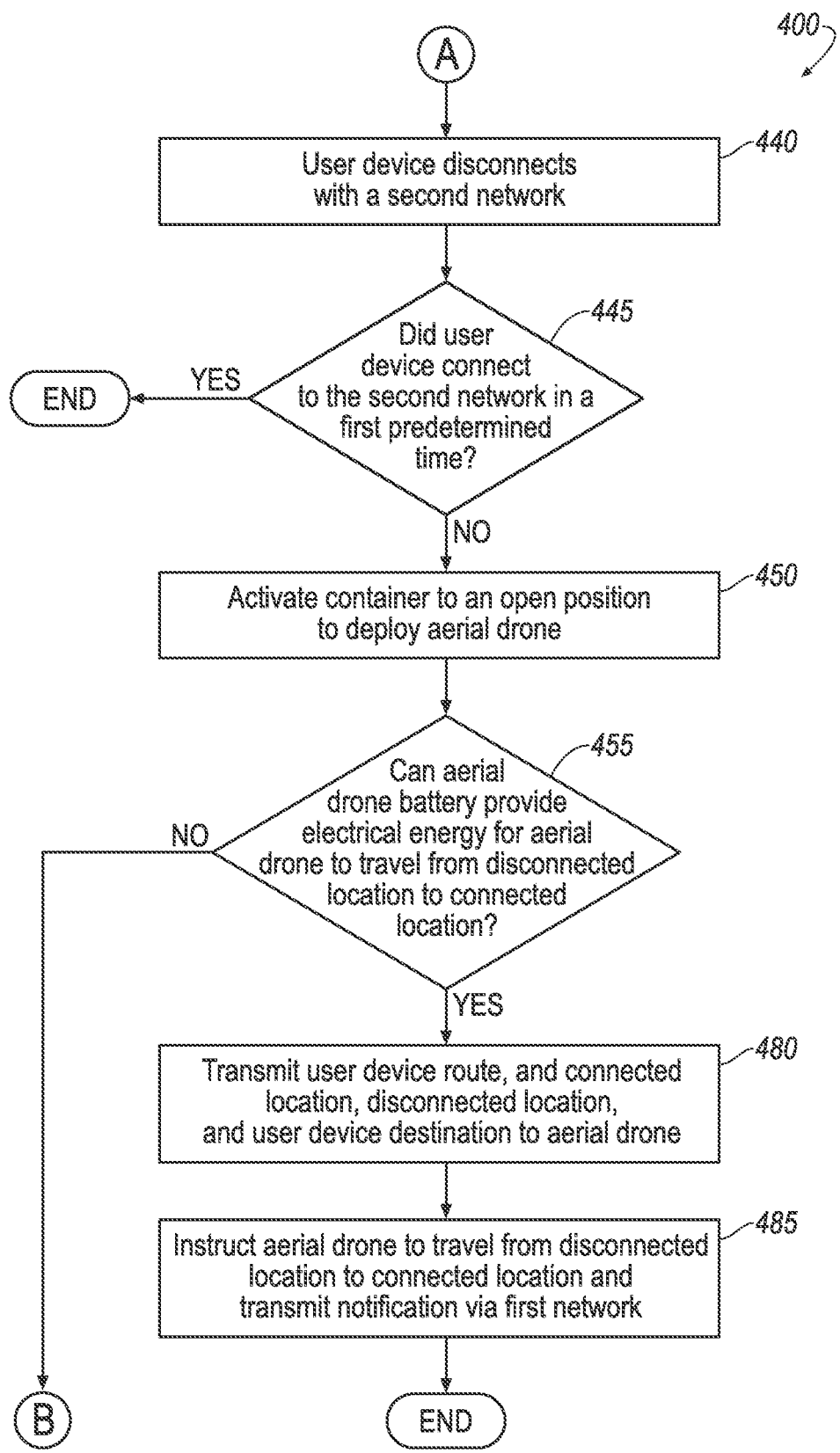
Figure 4C:
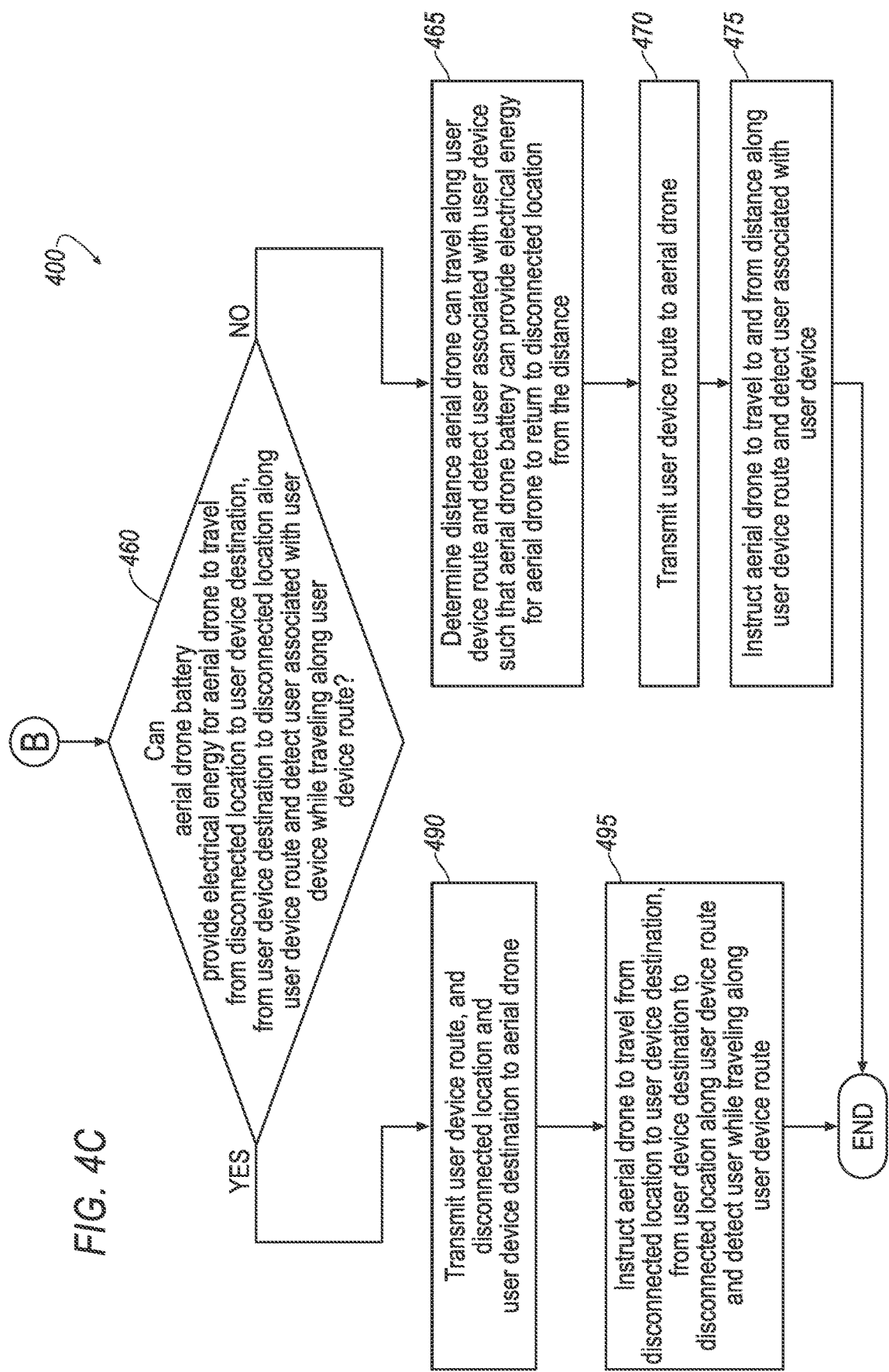

FIGS. 4A-C illustrate an example process 400 that may be executed by, e.g., the container computer 155. It is possible, and moreover even likely, that the computers 105, 195 in the other devices discussed above, such as the vehicle computer 105 and the aerial drone computer 195, may alternatively or additionally execute the example process 400.

The process 400 begins in a block 405 when, e.g., the user opens an application on the user device 230, pushes an input mechanism of the HMI 120, etc.

In the block 405, the container computer 155 detects a plurality of locations of the vehicle 100 at which the user device 230 is connected to the first network 135, as described above. Following the block 405, the process 400 proceeds to a block 410.

In the block 410, the container computer 155 stores a most recent location, including geographic coordinates of the most recent location as is known, of the vehicle 100 at which the user device 230 is connected to the first network 135, as discussed above. For example, the container computer 155 can be programmed to periodically detect, e.g., at 10-minute intervals, the locations of the vehicle 100 at which the user device 230 is connected to the first network 135 in the memory of the container computer 155, and store the most recent one of the plurality of locations. Following the block 410, the process 400 proceeds to a decision block 415.

In the decision block 415, the container computer 155 is programmed to determine whether the user device 230 loses the connection to the first network 135 for a second predetermined time, e.g., 15 minutes. The second predetermined time can be stored in the memory of the container computer 155. The second predetermined time is an amount of time to which a time the user device 230 is disconnected from the first network 135 is compared.

For example, as discussed above, the user device 230 can connect via the second network 140 to the communication interfaces 130, 185, 220, as described above. In the event the container computer 155 does not receive a data transmission from the communication interfaces 130, 185, 220, indicating that the user device 230 is connected to the first network 135 for a time equal to or exceeding the second predetermined time, the process 400 proceeds to a block 420. In the event the container computer 155 receives a data transmission from one or more of the communication interfaces 130, 185, 220 indicating that the user device 230 is connected to the first network 135 before the second predetermined time elapses, the process 400 returns to the block 410.

In the block 420, the container computer 155 designates and stores a most recent one of the plurality of vehicle 100 locations at which the user device 230 was connected to the first network 135 before determining the user device 230 lost the connection to the first network 135 for the second predetermined time as the connected location. Following the block 420, the process 400 proceeds to a decision block 425.

Additionally, or alternatively, the container computer 155 can accept user input to store a current and/or predetermined location as the connected location of the vehicle 100, if the user device 230 is connectable to the first network 135 at the current and/or predetermined location. Moreover, the container computer 155 can accept input from other mechanisms, such as a beacon, or each time the user device 230 receives a transmission from a new cell tower, etc., to store a location of the vehicle 100 as the connected location if the user device 230 is connectable to the first network 135 at the location.

In the decision block 425, the container computer 155 detects whether the user device 230 reconnects to the first network 135 after the second predetermined time, e.g., as described above. In the event the container computer 155 does not detect that the user device 230 reconnects to the first network 135 after the second predetermined time, the process 400 proceeds to a block 430. In the event the container computer 155 does, the process 400 returns to the block 410.

In the block 430, the container computer 155 determines the vehicle 100 has arrived at a destination. The container computer 155 can determine the vehicle 100 has arrived at the destination if, e.g., an ignition switch of the vehicle 100 has been turned off, the vehicle 100 stops moving for a predetermined time, the vehicle 100 has arrived at a predetermined destination, etc. From the block 430, the process proceeds to a block 435.

In the block 435, the container computer 155 stores the destination of the vehicle 100 as a disconnected location. The container computer 155 can store the disconnected location in, e.g., the memory of the container computer 155. From the block 435, the process 400 proceeds to a block 440.

In the block 440, the container computer 155 detects when the user device 230 disconnects from the second network 140.

As discussed above, the user device 230 can connect via the second network 140 with the communication interfaces 130, 185, 220, and the communication interfaces 130, 185, 220 can transmit data to, e.g., the container computer 155, indicating that the user device 230 is connected to the second network 140. Thus, in the event the container computer 155 does not receive a transmission of data from the communication interfaces 130, 185, 220 indicating the user device 230 is connected to the second network 140, such as when the user device 230 is not within range of the second network 140, the container computer 155 can detect that the user device 230 is disconnected from the second network 140. From the block 440, the process 400 proceeds to a decision block 445.

In the decision block 445, the container computer 155 determines whether the user device 230 connects with the second network 140 in the first predetermined time. The first predetermined time, e.g., 2 hours, can be an amount of time the user anticipates it will take to travel with the user device 230 via a user device 230 route from the disconnected location to a user device 230 destination, and return from the user device 230 destination back to the disconnected location via the user device 230 route.

The user can input the user device 230 route, the user device 230 destination, and the first predetermined time into the container computer 155 via, e.g., the HMI 120, before exiting the vehicle 100.

Additionally, or alternatively, the user can input the user device 230 route, the user device 230 destination, and the first predetermined time by inputting information into the user device 230. The user device 230 can transmit data to the container computer 155 via the second network 140 indicating the user device 230 route, the user device 230 destination, and the first predetermined time.

In the event the user device 230 connects to the second network 140 before the first predetermined time elapses, the process 400 ends. In the event the user device 230 does not connect to the second network 140 before the first predetermined time elapses, the process 400 proceeds to a block 450.

In the block 450, the container computer 155 sends an instruction to activate the container 145 to an open position to deploy the aerial drone 190. From the block 450, the process 400 proceeds to a decision block 455.

In the decision block 455, the container computer 155 determines whether the aerial drone battery 210 can provide electrical energy for the aerial drone 190 to travel from the disconnected location to the connected location, and transmit a notification via the first network 135.

In the event the container computer 155 determines the aerial drone battery 210 cannot provide the electrical energy for the aerial drone 190 to travel from the disconnected location to the connected location and transmit a notification via the first network 135, the process 400 proceeds to a decision block 460. In the event the container computer 155 determines the aerial drone battery 210 can provide the electrical energy for the aerial drone 190 to travel from the disconnected location to the connected location and transmit a notification via the first network 135, the process 400 proceeds to a block 480.

In the decision block 460, the container computer 155 determines whether the aerial drone battery 210 can provide electrical energy for the aerial drone 190 to travel from the disconnected location to the user device 230 destination, from the user device 230 destination to the disconnected location along the user device 230 route, and detect a user associated with the user device 230 while the aerial drone 190 travels along the user device 230 route.

In the event the container computer 155 determines the aerial drone battery 210 cannot provide electrical energy for the aerial drone 190 to travel from the disconnected location to the user device 230 destination, from the user device 230 destination to the disconnected location along the user device 230 route, and detect a user associated with the user device 230 while traveling along the user device 230 route, the process 400 proceeds to a block 465. In the event the container computer determines the aerial drone battery 210 can provide electrical energy for the aerial drone 190 to travel from the disconnected location to the user device 230 destination, from the user device 230 destination to the disconnected location along the user device 230 route, and detect a user associated with the user device 230 while traveling along the user device 230 route, the process 400 proceeds to a block 490.

In the block 465, the container computer 155 determines a distance the aerial drone 190 can travel from the disconnected location along the user device 230 route and detect the user associated with the user device 230 such that the aerial drone battery 210 can provide electrical energy for the aerial drone 190 to return to the disconnected location from the distance. From the block 465, the process 400 proceeds to a block 470.

In the block 470, the container computer 155 transmits data to the aerial drone 190 indicating the user device 230 route, and the distance to travel along the user device 230 route and detect the user associated with the user device 230 such that the aerial drone 190 can return to the disconnected location. The container computer 155 can transmit the data to the aerial drone 190 via the second network 140. The aerial drone 190 can store the user device 230 route and the distance in the memory of the aerial drone computer 195. From the block 470, the process 400 proceeds to a block 475.

In the block 475, the container computer 155 instructs the aerial drone 190 to travel to and from the distance along the user device 230 route and detect the user associated with the user device 230. Following the block 475, the process 400 ends.

In the block 480, the container computer 155 transmits data to the aerial drone 190 indicating the user device 230 route, and the connected location, the disconnected location, and the user device 230 destination to the aerial drone 190. The container computer 155 can transmit the data to the aerial drone 190 via the second network 140. The aerial drone 190 can store the user device 230 route, and the connected location, the disconnected location, and the user device 230 destination in the memory of the aerial drone computer 195. From the block 480, the process 400 proceeds to a block 485.

In the block 485, the container computer 155 instructs the aerial drone 190 to travel from the disconnected location to the connected location and transmit the notification via the first network 135.

The notification can include, e.g., an identity of the user associated with the user device 230, that the user has not returned to the vehicle 100 (i.e., the disconnected location) within the first predetermined time, the user device 230 route, the connected location, the disconnected location, and the user device 230 destination. The notification can be transmitted via the first network 135 to an emergency contact the user stored in the memory of the aerial drone computer 195, and/or to a predetermined recipient, e.g., a provider of emergency service. Following the block 485, the process 400 ends.

In the block 490, the container computer 155 transmits data to the aerial drone 190 indicating the user device 230 route, the disconnected location and the user device 230 destination. The container computer 155 can transmit the data to the aerial drone 190 via the second network 140. The aerial drone 190 can store the user device 230 route, the disconnected location and the user device 230 destination in the memory of the aerial drone computer 195. From the block 490, the process 400 proceeds to a block 495.

In the block 495, the container computer 155 instructs the aerial drone 190 to travel from the disconnected location to the user device 230 destination, from the user device 230 destination to the disconnected location along the user device 230 route, and detect the user associated with the user device 230 while the aerial drone 190 travels along the user device 230 route. Following the block 495, the process 400 ends.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided to illustrate certain embodiments, and should in no way be construed to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined not with reference to the above description, but should instead be determined with reference to claims appended hereto, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a computer programmed to:
    identify a connected location of a vehicle at which a user-carried device is connected to a first network by detecting a plurality of locations at which the user-carried device in the vehicle is connected to the first network while the vehicle is moving, and designating a most recent one of the plurality of locations as the connected location;
    identify a disconnected location of the vehicle at a vehicle destination at which the user- carried device is disconnected from the first network; and
    upon further determining that the user-carried device has not connected to a second network within a first predetermined time, activate an aerial drone container to an open position.

2. The system of claim 1, wherein the computer is further programmed to detect the plurality of locations periodically.

3. The system of claim 1, wherein the computer is further programmed to:
    identify the connected location after losing the connection with the first network while the vehicle is moving by detecting a reconnection location of the vehicle at which the user-carried device reconnects with the first network; and
    then continue to detect the plurality of locations.

4. The system of claim 1, wherein the computer is further programmed to:
    determine that an aerial drone battery can provide electrical energy for an aerial drone to travel from the disconnected location to the connected location;
    transmit the connected location, the disconnected location, a user-carried device route, and a user-carried device destination to the aerial drone; and
    instruct the aerial drone to travel to the connected location to transmit a notification.

5. The system of claim 4, wherein the computer is further programmed to:
    determine that the aerial drone battery can provide electrical energy for the aerial drone to travel from the connected location to the disconnected location after transmitting the notification; and
    instruct the aerial drone to travel from the connected location to the disconnected location after transmitting the notification.

6. The system of claim 4, wherein the computer is further programmed to:
    upon determining the aerial drone battery cannot provide electrical energy for the aerial drone to travel from the disconnected location to the connected location, determine that the aerial drone battery can provide electrical energy for the aerial drone to: travel from the disconnected location to a user-carried device destination, travel from the user-carried device destination along a user-carried device route to the disconnected location and detect a user associated with a user-carried device while travelling along the user-carried device route;
    transmit the disconnected location, the user-carried device destination and the user- carried device route to the aerial drone; and
    instruct the aerial drone to: travel to the user-carried device destination, travel from the user-carried device destination along the user-carried device route to the disconnected location and detect the user associated with the user-carried device while travelling along the user-carried device route.

7. The system of claim 6, wherein the computer is further programmed to:
    upon determining that the aerial drone battery cannot provide electrical energy for the aerial drone to: travel from the disconnected location to the user-carried device destination, travel from the user-carried device destination along the user-carried device route to the disconnected location and detect a user associated with a user-carried device while travelling along the user-carried device route, determine a distance the aerial drone can travel from the disconnected location along the user-carried device route and detect the user associated with the user-carried device such that the aerial drone can return to the disconnected location from the distance;
    transmit the user-carried device route to the aerial drone; and
    instruct the aerial drone to travel to and from the distance along the user-carried device route and detect the user associated with the user-carried device.

8. The system of claim 1, further comprising:
the container, wherein the container includes a battery charger electrically coupled to a battery and an aerial drone having a chargeable aerial drone battery;
wherein the computer is further programmed to:
determine that the aerial drone is in the container;
activate the battery charger to charge the aerial drone battery; and
deactivate the battery charger upon determining that the aerial drone battery is charged.

9. The system of claim 8, wherein the computer is further programmed to:
upon detecting that the aerial drone has returned to the disconnected location, determine that the aerial drone is in the container; and
then activate the battery charger to charge the aerial drone battery.

10. A method comprising:
identifying a connected location of a vehicle at which a user-carried device is connected to a first network by detecting a plurality of locations at which the user-carried device in the vehicle is connected to the first network while the vehicle is moving, and designating a most recent one of the plurality of locations as the connected location;
identifying a disconnected location of the vehicle at a vehicle destination at which the user-carried device is disconnected from the first network; and
upon further determining that the user-carried device has not connected to a second network within a first predetermined time, activating an aerial drone container to an open position.

11. The method of claim 10, further comprising detecting the plurality of locations periodically.

12. The method of claim 10, further comprising:
identifying the connected location after losing the connection with the first network while the vehicle is moving by detecting a reconnection location of the vehicle at which the user-carried device reconnects with the first network; and
then continuing to detect the plurality of locations.

13. The method of claim 10, further comprising:
determining that an aerial drone battery can provide electrical energy for an aerial drone to travel from the disconnected location to the connected location;
transmitting the connected location, the disconnected location, a user-carried device route, and a user-carried device destination to the aerial drone; and
instructing the aerial drone to travel to the connected location to transmit a notification.

14. The method of claim 13, further comprising:
determining that the aerial drone battery can provide electrical energy for the aerial drone to travel from the connected location to the disconnected location after transmitting the notification; and
instructing the aerial drone to travel from the connected location to the disconnected location after transmitting the notification.

15. The method of claim 13, further comprising:
upon determining the aerial drone battery cannot provide electrical energy for the aerial drone to travel from the disconnected location to the connected location, determining that the aerial drone battery can provide electrical energy for the aerial drone to: travel from the disconnected location to a user-carried device destination, travel from the user-carried device destination along a user-carried device route to the disconnected location and detect a user associated with a user-carried device while travelling along the user-carried device route;
transmitting the disconnected location, the user-carried device destination and the user- carried device route to the aerial drone; and
instructing the aerial drone to travel to: the user-carried device destination, travel from the user-carried device destination along the user-carried device route to the disconnected location and detect the user associated with the user-carried device while travelling along the user-carried device route.

16. The method of claim 15, further comprising:
upon determining that the aerial drone battery cannot provide electrical energy for the aerial drone to: travel from the disconnected location to a user-carried device destination, travel from the user-carried device destination along a user-carried device route to the disconnected location, and detect a user associated with a user-carried device while travelling along the user-carried device route, determining a distance the aerial drone can travel from the disconnected location along the user-carried device route and detect the user associated with the user-carried device such that the aerial drone can return to the disconnected location from the distance;
transmitting the user-carried device route to the aerial drone; and
instructing the aerial drone to travel to and from the distance along the user-carried device route and detect the user associated with the user-carried device.

17. The method of claim 10, wherein the container includes a battery charger electrically coupled to a battery and an aerial drone includes a chargeable aerial drone battery; and
the method further comprising:
determining that the aerial drone is in the container;
activating the battery charger to charge the aerial drone battery; and
deactivating the battery charger upon determining that the aerial drone battery is charged.

18. The method of claim 17, further comprising:
upon detecting that the aerial drone has returned to the disconnected location, determining that the aerial drone is in the container; and
then activating the battery charger to charge the aerial drone battery.

* * * * *